United States Patent [19]

Blanchard et al.

[11] Patent Number: 5,303,083
[45] Date of Patent: Apr. 12, 1994

[54] POLARIZED LIGHT RECOVERY

[75] Inventors: Randall D. Blanchard, Vista; Eugene W. Cross, Jr., Escondido; Ronald D. Shirley, Vista, all of Calif.

[73] Assignee: Hughes Aircraft Cmpany, Los Angeles, Calif.

[21] Appl. No.: 935,622

[22] Filed: Aug. 26, 1992

[51] Int. Cl.⁵ .................. G02B 5/32; G02B 27/28; G02F 1/1335
[52] U.S. Cl. .................... 359/495; 359/497; 359/499
[58] Field of Search ............ 359/487, 493, 494, 495, 359/496, 497, 499, 73, 498; 385/16

[56] References Cited

U.S. PATENT DOCUMENTS

| | | | |
|---|---|---|---|
| 2,449,287 | 9/1948 | Flood | 359/495 |
| 2,748,659 | 6/1956 | Geffcken et al. | 359/495 |
| 4,125,843 | 11/1978 | Whitby | 359/495 |
| 4,844,593 | 7/1989 | Parker et al. | 359/497 |
| 5,073,830 | 12/1991 | Loucks | 359/495 |
| 5,077,483 | 12/1991 | Cloonan et al. | 385/16 |
| 5,078,482 | 1/1992 | Feldman et al. | 359/494 |
| 5,124,841 | 6/1992 | Oishi | 359/495 |
| 5,164,854 | 11/1992 | Takanashi et al. | 359/495 |
| 5,223,956 | 6/1993 | Kramer et al. | 359/499 |
| 5,223,975 | 6/1993 | Naganuma et al. | 359/495 |

Primary Examiner—Martin Lerner
Attorney, Agent, or Firm—Georgann S. Grunebach; Terje Gudmestad; Wanda K. Denson-Low

[57] ABSTRACT

Liquid crystal light valve projection systems can use substantially all of the reading light from a high intensity reading light source by converting all single polarization state. Light reflected from a polarization beam splitter (44) that cannot be used because it is of wrong polarization state is recovered with improved efficiency, color balance and collimation by means of a polarization recovery prism (50) employing a reflective surface (56) interposed between two quarter-wave retarders (58,60). The light of wrong polarization from the polarizing beam splitter (44) is passed through a first quarter-wave retarder (58), which circularly polarizes the beam. The beam is then reflected from a mirrored surface (56) to reverse the direction of the circular polarization. The reflected beam of reversed circular polarization is then converted to a beam of light of the desired polarization by passage through a second quarter-wave retarder (60) and is transmitted in a path parallel to the path of the original beam together with light transmitted directly from the polarization beam splitter (44).

14 Claims, 2 Drawing Sheets

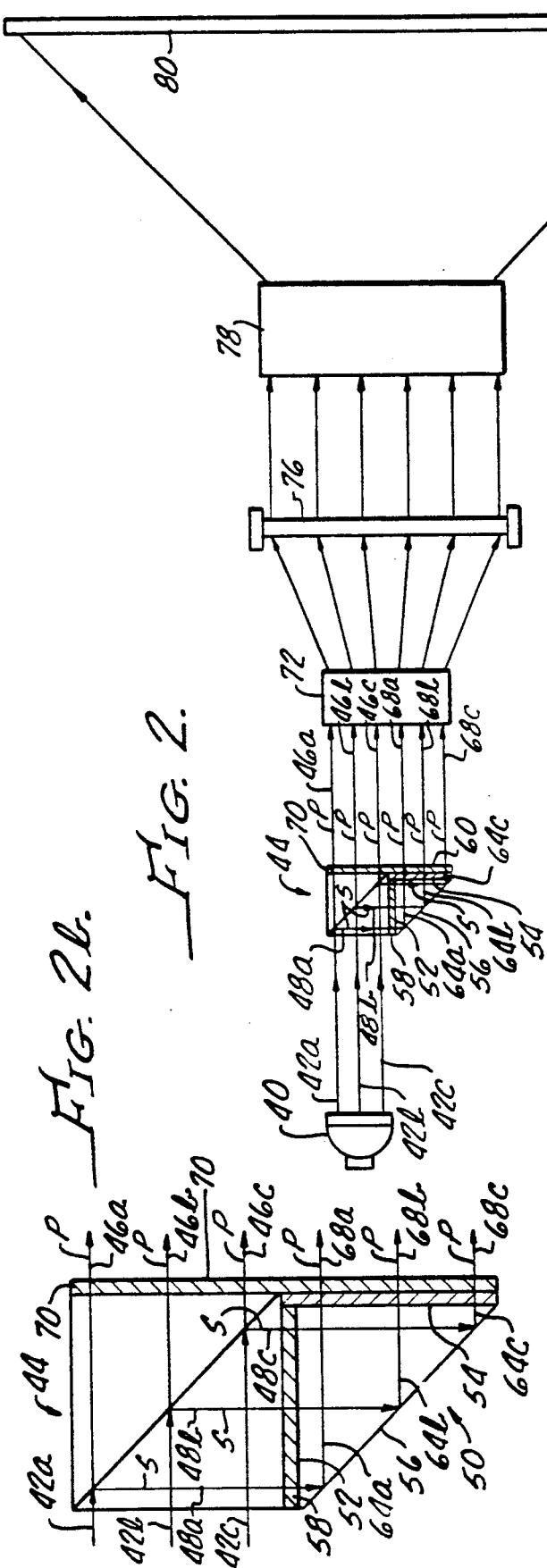

POLARIZED LIGHT RECOVERY

BACKGROUND OF THE INVENTION

1. Field of the Invention

The present invention relates to liquid crystal devices and particularly concerns improved conversion of unpolarized light to light of a single polarization state.

2. Description of Related Art

Recent developments and wider use of liquid crystal display systems, such as a video projectors, have emphasized the need for increased efficiency in illumination of the liquid crystal devices. The CRT addressed reflective liquid crystal light valve (LCLV) is a thin film, multi-layer structure comprising a liquid crystal layer, a dielectric mirror, a light blocking layer and a photosensitive layer, all sandwiched between two transparent electrodes. In a CRT addressed reflective liquid crystal light valve projection system a polarized illumination (reading) beam is obtained by directing an unpolarized beam from a high intensity light source, such as a xenon arc lamp for example, to a polarizing beam splitter, which divides the incoming light into two beams, one having a P polarization state and the other having an S polarization state. Light of one of these polarization states is passed through the liquid crystal layer to the dielectric mirror, which reflects it back through the liquid crystal layer. The liquid crystal material is optically addressed by an input image of relatively low intensity writing light, such as that generated by a cathode ray tube, the output of which is applied to the photosensitive layer. Therefore, if a complex distribution of light, for example a high resolution input image from the cathode ray tube, is focused on the photosensitive layer, the device converts the relatively low intensity input image into a high intensity replica image which can be reflected for projection with magnification to produce a high brightness image on a large viewing screen.

In active-matrix liquid crystal display (AMLCD) projection systems each pixel is addressed by means of a high intensity light beam of a single polarization state that is directed through a matrix of thin film transistors to provide a projection system that may realize a full color, high quality screen display of large size. The transistors are collectively and selectively activated to provide an image defined by the spatial array of selectively activated transistors.

As compared with conventional cathode ray tube projectors, the liquid crystal light valve projectors have many advantages in regard to compact size, light weight, low cost, and accurate color registration, among others. However, they still exhibit disadvantages in regard to total light output, which is primarily screen brightness, because of the low transmittance of the required polarizing beam splitter and the thin film transistor mode of addressing the active-matrix liquid crystal light valve. These systems can use light of only one polarization state. The polarizing beam splitter, which effectively passes only one half of the light, is necessary for those devices employing twisted nematic liquid crystal mode operation, which can operate on light of only a single polarization state. Accordingly, recovery of otherwise discarded light is essential for efficient operation.

Use of a light source of higher intensity, to overcome high losses, is undesirable. Increased intensity is limited by allowable temperature increase of the projector system components, by available light source power, and by efficiency and economics. A high power light source may cause deterioration of the polarization beam splitter and the liquid crystal light valve itself.

Ability to use all of the light from the high power illumination source has been recognized as highly desirable and will enable a projector of this kind to reduce power consumption by nearly fifty percent, or, for small units, to enable a significant increase of screen brightness.

Recognizing the need to improve efficiency of illumination, systems have been devised for recovery of the otherwise wasted light of the wrong polarization. The polarizing beam splitter passes light of P state polarization and reflects light of S state polarization. Only light of one or the other polarization state, but not both, can be used to illuminate the liquid crystal light valve face. Accordingly, it has been suggested to change the polarization state of the otherwise unused light into light of the useful polarization state and then combine the two so as to theoretically avoid the fifty percent loss of the illumination light. Prior schemes for recovery of the light of nonusable polarization state have included various systems using polarization rotating mirrors and half-wave retarder plates. All have problems. Reflective devices, although changing the direction of linear polarization, introduce a significant amount of depolarization, providing an output having a portion of elliptically polarized or depolarized light. Elliptically polarized light degrades efficiency of operation of the liquid crystal light valve. Further, light reflected from a pair of mirrors and passed through a half-wave retarder for change of polarization is not precisely nor adequately collimated. When combined with the incident light of the useful polarization state from the polarizing beam splitter, further inefficiencies in operation of the liquid crystal light valve are introduced by such lack of collimation.

Importantly, the half-wave retarder plate that has been used in prior polarized light recovery arrangements suffers from chromatic variation of light output. Intensity of the output light of desired polarization from the half-wave retarder is significantly decreased at higher and lower ends of the visible spectrum, so that intensity of both blue and red components of the desired polarization for a full spectrum light beam are decreased with respect to intensity of the intermediate wavelength green component of the desired polarization. This variation across the spectrum can be minimized by decreasing green intensity, but only at the cost of decreased efficiency.

Still further, such prior systems for converting polarization state have combined the original and recovered beam by effectively converging the two so as to be mutually superposed on the illuminated face of the liquid crystal light valve. Such prior devices provide a converging cone angle between the two light sources that is great enough to cause a significant amount of the desired light to fall outside of the desired collection cone angle of the projection lens, and thus to be wasted. In addition, light recovery devices of the prior art are generally complex, expensive and require relatively large numbers of components, thereby requiring a large package and increased costs of manufacture.

Accordingly, it is an object of the present invention to provide a polarized light recovery system that avoids or minimizes above mentioned problems.

SUMMARY OF THE INVENTION

In carrying out principles of the present invention in accordance with a preferred embodiment thereof, unpolarized light is converted to light having a single polarization state by separating the unpolarized light into an original beam of a first polarization state and a separated beam of a second polarization state. The separated beam is then circularly polarized, and the direction of circular polarization is reversed. The reversed circularly polarized separated beam is changed to a recovered light beam having the first polarization state and combined with the original beam of the first polarization state. The two beams are transmitted along closely adjacent parallel paths. In one embodiment the recovery is carried out by passing unpolarized light to a polarizing beam splitter which provides an original beam of first polarization state and a separated beam of a second polarization state. The separated beam of second polarization state is passed through a quarter-wave retarder to provide circular polarization of the beam, which polarization is then reversed by impingement of the separated beam upon a reflector. The beam of reversed circular polarization from the reflector is then passed through a second quarter-wave retarder, which changes the polarization to the linear polarization state of the original beam from the polarizing beam splitter. The two are then transmitted with a small cone angle along side by side substantially parallel paths to a beam expanding lens that enlarges the light source image to a size that illuminates the entire face of the liquid crystal light valve of the projecting system.

BRIEF DESCRIPTION OF THE DRAWINGS

In the accompanying drawings:

FIGS. 2, 2a and 2b illustrate components of a liquid crystal light valve projection system employing an improved light recovery arrangement;

FIGS. 4a and 4b illustrate certain alternate configurations of the polarization recovery system.

DESCRIPTION OF THE PREFERRED EMBODIMENTS

Figure 1:
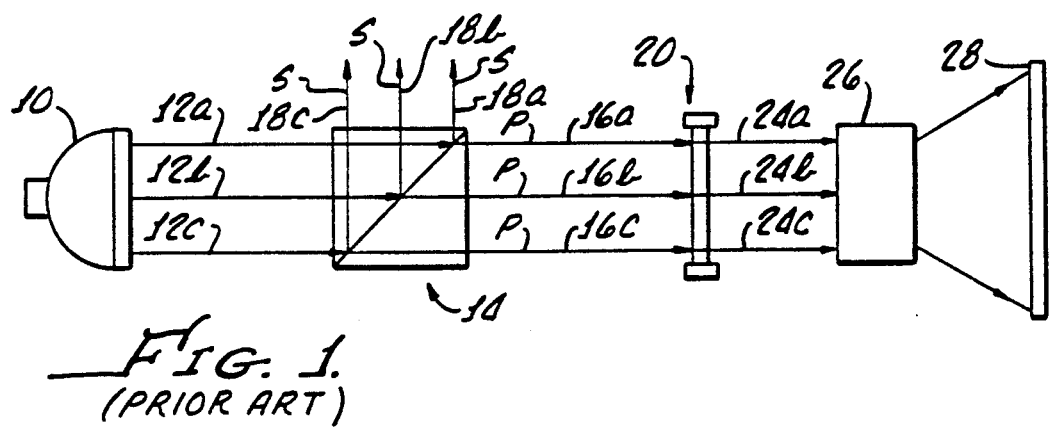
FIG. 1 is a simplified illustration of components of a prior art liquid crystal light valve projection system.

Illustrated in FIG. 1 is a simplified transmissive liquid crystal projector system employing an active matrix liquid crystal module. High intensity light from a source, such as an arc lamp 10, is directed along light paths 12a, 12b, 12c to a polarizing beam splitter prism 14, which transmits light of a first linear polarization state and reflects light of a second linear polarization state. Thus, for example, polarized light of P state is transmitted by the prism 14 along light paths generally indicated at 16a, 16b, and 16c, whereas light of S polarization state is reflected from the prism along light paths indicated at 18a, 18b and 18c. Light of P polarization state is transmitted to an active matrix liquid crystal light valve 20 which includes an array or matrix of thin film transistors that are selectively operated in a predetermined spatial pattern to allow the polarized light to strike the face of the liquid crystal light valve module 20 and to be transmitted therethrough in a selected imaging pattern. Light transmitted through the liquid crystal light valve module is indicated by optical paths 24a, 24b and 24c, and transmitted to a projection lens 26 for projection on an imaging screen 28.

Light of polarization state S is reflected from the polarizing beam splitter 14 and may be completely lost or discarded. This light may comprise fifty percent of the input light provided from the source 10.

Prior arrangements for recovery of the otherwise discarded light of polarization state S have included a recovery system (not shown) in which the S state polarized light is passed through a half-wave retarder that changes the light of S state polarization to light of P state polarization. This changed polarization light is then fed along a suitable folded optical path, being reflected from a surface positioned at an angle of nearly 45° to the main beam path, so as to impinge upon the surface on the face of the liquid crystal module 20. The recovered beam is directed so as to converge, at the face of the liquid crystal module 20, with the beam transmitted directly from the polarization recovery prism 14. Thus, the prior art recovery system images the two converging beams on the face of the liquid crystal module. As mentioned above, such prior recovery systems do not produce a truly collimated beam, are highly non-achromatic and are neither compact nor simple.

Applicants have provided an improved polarized light recovery system employing two quarter-wave retarders which are much more efficient and have a more linear or flat response across the visible spectrum.

A simplified projection system employing the improved polarized light recovery system of the present invention is illustrated in FIG. 2. Separate portions of the system of FIG. 2 are shown in enlarged view in FIGS. 2a and 2b. Light from a high intensity light source 40, which may be a xenon arc lamp for example, is fed along the light paths indicated at 42a, 42b, 42c to a polarizing beam splitting prism 44 (FIB. 2b), which passes light of P state polarization along paths indicated at 46a, 46b, 46c. Light of polarization state S is reflected from the polarizing beam splitter along paths 48a, 48b, 48c to a polarizing light recovery device, generally indicated at 50 (FIGS. 2a and 2b). This polarizing light recovery device is shown separately in FIG. 2a. The polarizing recovery device basically comprises a right angle prism having an input face 52, an output face 54 positioned at a right angle to the input face and having the same size as the input face, and an inclined hypotenuse 56 forming a reflective surface of the system that extends at 45° with respect to each of the input and output faces. The hypotenuse 56 is coated with a suitable reflective silver coating to optimize reflection. Mounted upon and suitably adhered to the input face 52 is a first quarter-wave retarder 58. A second quarter-wave retarder 60 is mounted upon and suitably adhered to the output face 54.

Referring to FIGS. 2a and 2b, the polarization recovery system prism 50 is positioned immediately adjacent one surface of the polarizing beam splitter 44 to receive the S state polarization light reflected by the beam splitter along paths 48a, 48b and 48c. This light of S polarization state, in passing through the quarter-wave retarder 58, is circularly polarized by the action of the quarter-wave retarder, and then passes to the silvered reflecting surface 56 of the recovery prism 50. Reflection from surface 56 reverses the direction of circular polarization of the light and passes this reversed circularly polarized light along paths 64a, 64b and 64c to the second or output quarter-wave retarder 60. The latter operates on the reversely circularly polarized light to linearly polarize the light, providing it with a single P state polarization that is transmitted from the recovery device along paths 68a, 68b and 68c. The second quarter-wave retarder 60 restores polarization from the reversely circularly polarized condition to a linear condition, wherein the polarization vector exactly matches (is aligned with) the vector of the originally linearly polarized light. Thus, effectively, the combination of polarizing beam splitter 44 and polarization recovery device 50 provide (a) an original beam of single polarization P on paths 46, and (b) a separated beam of P polarization along paths 68. The paths of the original beam (paths 46a, b, c) and the separated beam (paths 68a, b, c) are parallel to one another. The polarization of the separated beam (in paths 68) is precisely aligned with the polarization of the P state light (in paths 46). To ensure precision alignment of the polarization vectors of the two beams 46,68, the polarization alignment of the beam on paths 68 may be readily adjusted, as by adjustably rotating the quarter-wave retarder 60 about an axis normal to its surface. An anti-reflective coating 70 (FIGS. 2 and 2b) is applied to the output faces of both the polarizing beam splitter 44 and the polarized light recovery prism 50.

The two beams from the polarizing beam splitter 44 and polarizing light recovery prism 50 are collimated and diverge at a small cone angle, which is in the order of 3° to 4 ½°. These beams are fed to a beam expansion or enlarging lens 72 so that each of the parallel beam parts, that provided along paths 46 and that provided along paths 68, impinges upon a different part of the lens 72. The two parallel beam parts are closely adjacent each other but have no significant overlap. Lens 72 combines and further expands the two collimated beams of P polarization state to direct them to impinge upon the full area of an active matrix liquid crystal module 76. Polarized light of a single polarization state incident upon the liquid crystal module is passed in a selected spatial pattern according to the selective activation of the transistor array that controls the liquid crystal module. Light transmitted through the liquid crystal module is directed to a projection lens 78, which provides further expansion and projects the desired image upon a screen 80.

Quarter-wave retarders are readily available with a flat chromatic transmissivity across the entire visible spectrum, and thus little or no chromatic variation is introduced by the recovery prism. The reflective surface 56 of the recovery prism is positioned at precisely 45° with respect to the direction of the optical light path in the projection axis. Therefore the original beam of P state polarization and the separated beam of P state polarization, the first from the polarization beam splitter 44 and the second from the recovery prism 50, are precisely parallel to one another. This feature, combined with the adjustable alignment of the polarization vector of the separate beam output from the recovery prism 50, provides for precisely equal alignment of the polarization vector of all of the light impinging upon the liquid crystal module. The two parallel beam portions are combined by passage through different portions of the enlarging lens 72. Thus it is not necessary to cause the two beams to converge for combination on a common area, as in the prior art. The arrangement enables the cone angle of the two parallel beams to be at a sufficiently small value so as to avoid waste of any of this light, all of which impinges on the liquid crystal module face. Little or none of the light is caused to pass beyond the boundaries of the liquid crystal module. There is no half-wave retarder for depolarizing any of the light, and thus high efficiency of operation of the liquid crystal module is maintained.

In a particular embodiment of the system illustrated in FIG. 2, light from the arc lamp 40 is directed to the input face of the polarizing beam splitter 44 by means of a bundle of optical fibers (not shown) which is provided with a square output face that may be precisely congruent with the square input face of the polarizing beam splitter. This input face, for example, may be one quarter inch square, with the beam expanding lens 72 providing an expansion of the combined beams to precisely and fully cover the approximately one and one-half inch square face of the liquid crystal module 76. The projection lens may thus readily provide a full brightness image on a six inch square screen 180. This embodiment has been developed for an aircraft cockpit display, but of course is readily adapted to displays of other configurations and larger sizes, including systems for projection of images on screens in the order of ten to fifteen feet square.

An exemplary system embodying principles of the present invention provides a display that is readable in sunlight in a fighter aircraft application, and has a six inch square screen with a brightness of 1500 fl and a contrast ratio in sunlight of 35:1. The light recovery prism in this exemplary application provides an 87% efficiency in conversion of unpolarized light into usable vertically polarized achromatic light within the F/9.5 acceptance angle of the projection lens.

The described polarization recovery prism, which has been shown in its application to a projection system that uses an active matrix transmissive liquid crystal module, is readily adaptable to any system requiring an efficient source of light of a single polarization state. Thus, principles of the invention as described herein are readily applicable to a projection system, for example, employing a reflective liquid crystal light valve.

The system illustrated in the drawings is shown as a monochromatic system for convenience of illustration. It will be readily appreciated, however, that the described polarization light recovery arrangement is equally applicable to a full color liquid crystal projection system.

Figure 3:
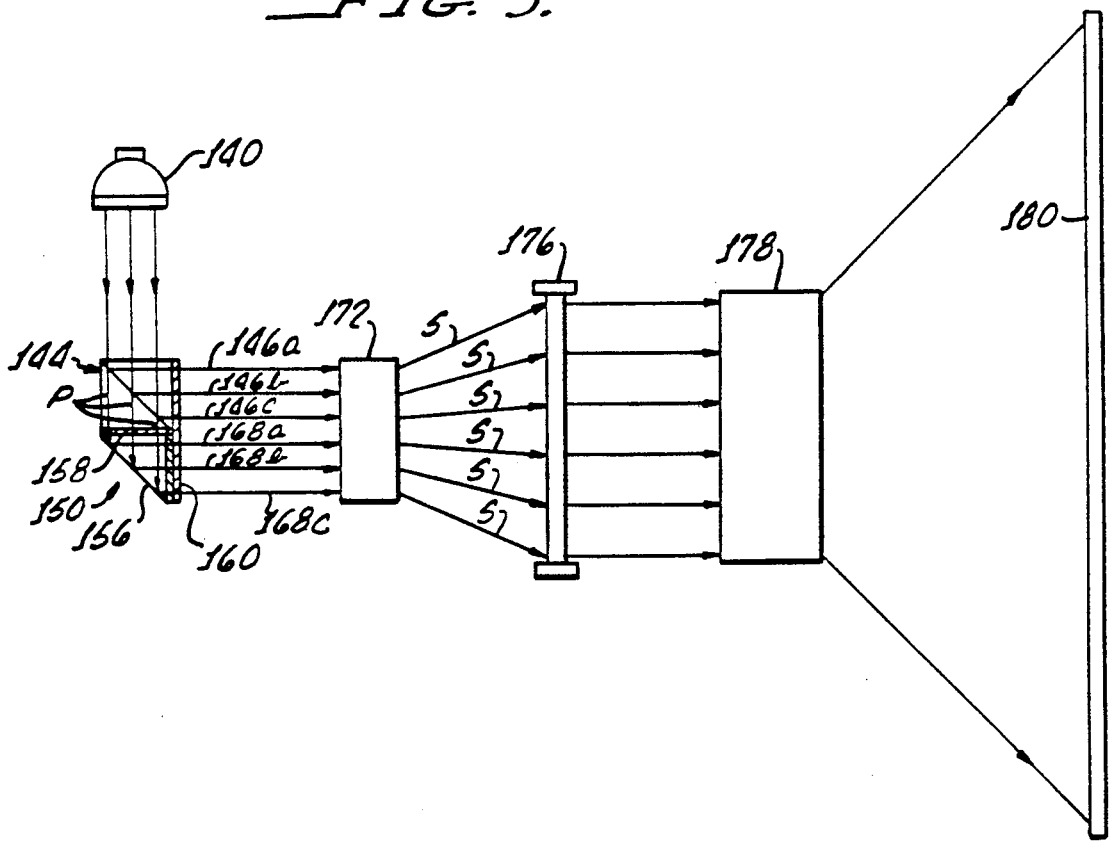
FIG. 3 illustrates a modification of the system of FIG. 2 arranged to provide light of a different polarization state.

Illustrated in FIG. 3 is a slight modification of the system of FIG. 2 that is configured for providing light of a single S state polarization, whereas the system of FIG. 2 provides light of a single P state polarization. Components in FIG. 3, that are the same as or similar to components of FIG. 2, are identified by the same reference numerals, but have the added prefix 1, so that lamp 40 of FIG. 2 corresponds to lamp 140 of FIG. 3, for example. Unpolarized light from an arc lamp 140 is fed to a polarizing beam splitter 144, which reflects light of S state polarization along paths 146a, 146b, 146c to a beam expansion lens 172. Light of P polarization state is transmitted through the polarizing beam splitter to a light recovery prism 150, having a first quarter-wave retarder 158, a 45° angle reflective surface 156 and an output quarter-wave retarder 160. The polarization recovery prism accordingly provides a recovered beam of polarization state S along paths 168a, 168b and 168c, which is directed to a second portion of the expanding lens 172 along paths immediately adjacent and precisely parallel to the path of the original light beam 146. The remainder of the system is the same. Light from the beam expanding lens 172 is expanded to be incident upon the full active face of active matrix liquid crystal module 176, from whence it is transmitted to projection lens 178 for further expansion and projection upon a display screen 180.

By making the prism components twice as wide as they are tall, as indicated in FIG. 4a, the resulting output light beam footprint, shown in FIG. 4b, will be square, although other proportions are possible. This particular arrangement is especially useful for a collimated beam. Thus FIG. 4a shows the output face of a polarizing beam splitter 244 adjacent to the output face of a polarizing recovery prism 250, each of which has a dimension in the horizontal direction (as viewed in FIG. 4a) that is twice its vertical dimension. The two combined parallel and side by side beams thus provide a combined square footprint 246,268 as shown in FIG. 4b.

What is claimed is:

1. A method for converting unpolarized light to light having a single polarization state comprising the steps of:
   dividing a beam of unpolarized light into an original beam of a first polarization state and a separated beam of a second polarization state,
   passing said separated beam in a first direction through a first quarter-wave retarder to provide a first circularly polarized beam,
   passing said first circularly polarized beam in a second direction at a right angle to said first direction through a second quarter-wave retarder oriented at a perpendicular to said first quarter-wave retarder to provide a recovered beam having the polarization state of said original beam, and
   directing at a utilization device both said original and recovered beams.

2. The method of claim 1 wherein said step of passing said first circularly polarized beam in a second direction includes the step of reversing the circular polarization of said circularly polarized beam and changing its direction by ninety degrees.

3. The method of claim 2 wherein said step of reversing comprises reflecting said circularly polarized beam from said first retarder to said second retarder.

4. The method of claim 1 including the step of reversing the circular polarization of said first circularly polarized beam to provide a second circularly polarized beam, said step of passing the beam through a second quarter-wave retarder comprising passing the second circularly polarized beam through the second retarder.

5. The method of claim 1 wherein said step of directing comprises transmitting said original and recovered beams along mutually adjacent parallel paths.

6. A method of converging unpolarized light to light having a single polarization state, comprising:
   separating said unpolarized light into an original beam of a first linear polarization state transmitted in a first direction and a separated beam of a second linear polarization state transmitted in a second direction perpendicular to said first direction,
   circularly polarizing said separated beam via a first quarter-wave retarder,
   reversing the circular polarization of said circularly polarized separated beam and changing its direction by about ninety degrees,
   restoring the linear polarization of said reversely circularly polarized beam via a second quarter-wave retarder oriented at about ninety degrees to said first quarter-wave retarder to provide a recovered light beam having said first linear polarization state, and
   combining said original and separated beams.

7. The method of claim 6 wherein said step of circularly polarizing said separated beam comprises passing said separated beam through a quarter-wave retarder plate.

8. The method of claim 7 wherein said step of reversing comprises reflecting said circularly polarized beam from said first retarder to said second retarder.

9. The method of claim 6 wherein said step of combining comprises transmitting said original and recovered beams along closely adjacent parallel paths as a combined beam.

10. The method of claim 9 including the step of directing said combined beams to a beam expansion lens.

11. The method of claim 9 including the step of expanding said combined beam.

12. A liquid crystal light valve projection system comprising:
   a light source for providing an input beam of unpolarized light,
   a polarizing beam splitter positioned to receive said input light, to transmit a first light beam of a first polarization state and to reflect light of a second polarization state, and
   a polarization recovery prism configured and arranged to receive light of said second polarization state from said polarization beam splitter, said polarization recovery prism comprising:
   quarter-wave retarder means for circularly polarizing said light of said second polarization state,
   reflector means for reflecting and reversing the circular polarization of light from said first quarter wave retarder means, and
   second quarter-wave retarder means for restoring polarization of said reversed circularly polarized light to provide a recovered light beam having a linear polarization state that matches and is aligned with the linear polarization state of said first beam.

13. The system of claim 12 including a liquid crystal module positioned to receive both said first and recovered beams, and a beam expansion lens interposed between said polarization recovery prism and said liquid crystal module.

14. The system of claim 12 wherein said polarizing beam splitter and polarization recovery prism are configured and arranged to provide mutually parallel beams of the same linear polarization state, having an expansion angle not greater than about 3°.

* * * * *